Nov. 17, 1959 — T. F. HURSEN — 2,912,998
SAFETY VALVE
Filed Nov. 6, 1957
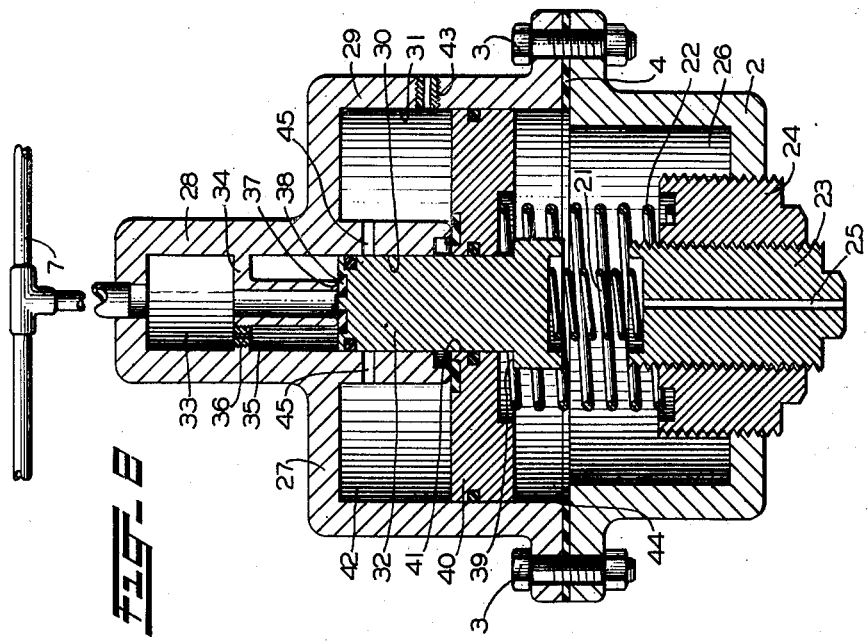
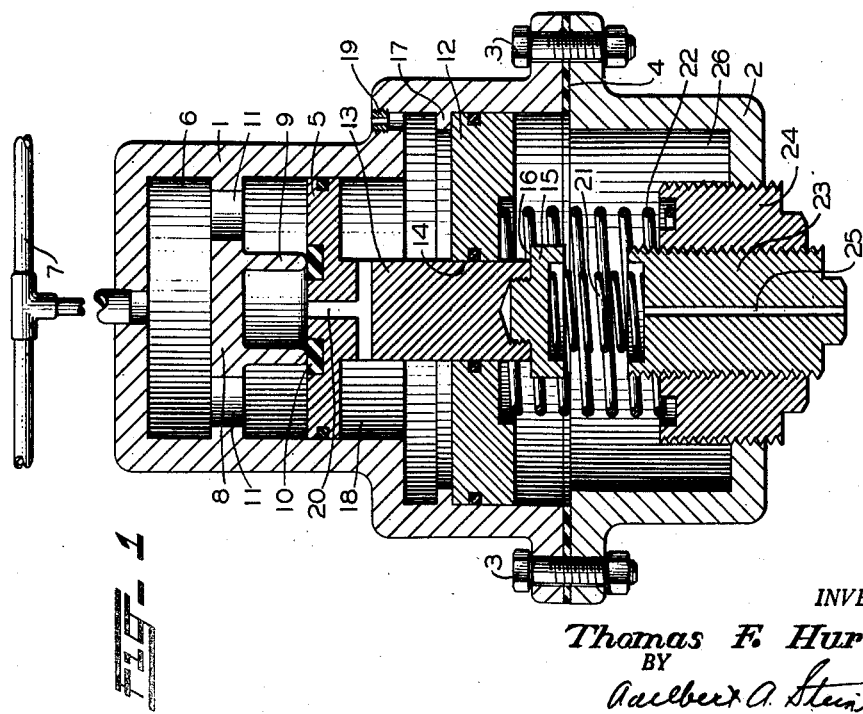
INVENTOR.
Thomas F. Hursen
BY
Aaelbert A. Steinmiller
ATTORNEY

2,912,998
SAFETY VALVE

Thomas F. Hursen, Monroeville, Pa., assignor to Westinghouse Air Brake Company, Wilmerding, Pa., a corporation of Pennsylvania Application November 6, 1957, Serial No. 694,773

10 Claims. (Cl. 137—474)

This invention relates to safety valve devices of the type having maximum and minimum pressure settings at which the valve device opens and closes, respectively, for relieving excessive fluid pressure from any pressure system in which the device is employed.

The present invention comprises a safety valve of the above-mentioned type characterized by a piston cooperating with a piston valve in such manner that the piston is subjected to fluid pressure in the system upon unseating of the piston valve and is operable to maintain said piston valve in an unseated position until the pressure of fluid in the system is reduced to the predetermined minimum pressure, thereby insuring against premature closing of the safety valve. In order to safeguard against undesirable operation of the safety valve due to momentary pressure surges, a portion of the piston valve pressure area is restrictedly subjected to the pressure of fluid in the system by having said portion open to system pressure solely through a choke. Means are provided in the device for independently varying the maximum and minimum pressure settings.

Accordingly, the object of the invention is to provide a simple, inexpensive safety valve device having positive operation to insure uniform reduction of fluid pressure in the system to a desired degree below the setting of the safety valve, and further characterized by means for preventing undesirable operation of the safety valve device due to momentary pressure surges.

The invention is described hereinafter in greater detail in conjunction with the accompanying drawing wherein:

Fig. 1 is an elevational sectional view of one embodiment of the invention, and

Fig. 2 is an elevational sectional view of another embodiment of the invention.

Description and operation—Fig. 1

Referring to Fig. 1 of the drawing, one embodiment of the invention comprises a casing having two opposed cup-shaped sections 1 and 2 sealingly clamped together at the flanges thereof by bolts 3 with a sealing gasket 4 therebetween to prevent leakage of fluid under pressure.

A piston valve 5 is slidably operable in a bore formed in casing section 1 and cooperates with said casing section to define a pressure chamber 6 to which is connected a fluid pressure container, such as a conduit 7 for example, which is to be protected against excessive pressure of fluid. A supporting wall 8, formed integrally with casing section 1 within chamber 6, has formed on one side thereof a central annular rib seat 9. The piston valve 5 has a normal or closed position defined by engagement of an annular sealing gasket 10, carried in the face of said piston valve adjacent chamber 6, with the rib seat 9. With the piston valve 5 seated on the rib seat 9, only that area of the face of the piston valve outside the rib seat 9 is subjected to the pressure of fluid present in chamber 6 through a plurality of large openings 11 in wall 8.

A piston 12, of larger diameter than piston valve 5, is slidably operable in a correspondingly larger bore in casing section 1 in coaxial relation to said piston valve. Piston valve 5 has a central stem 13 sealingly and slidably operable in a central bore 14 in piston 12, which stem extends through said bore from the side of piston 12 facing said piston valve and terminates a short distance beyond the opposite side of piston 12. A screw plug 15 of larger diameter than the stem is screwed into the end of the stem 13 to provide an annular shoulder 16. Piston 12 has a normal neutral position defined by engagement of the periphery thereof with an annular shoulder 17 that extends inwardly from the wall of casing section 1 into the bore in which the piston 12 operates and is movable downwardly from said normal position, in a manner to be hereinafter described, to engage shoulder 16 for a purpose to be hereinafter explained.

Formed between piston valve 5 and piston 12 within casing section 1 is a control chamber 18 that is open to atmosphere by way of a restricted vent port 19 in the casing wall of predetermined flow capacity less than the flow capacity of the inlet to chamber 6 by which conduit 7 is connected thereto. A passageway 20 is provided in stem 13 of piston valve 5 to provide constant relatively large capacity communication between chamber 18 and the opposite side of said piston valve, said passageway opening on said opposite side of said piston valve within the area encircled by the rib seat 9 when the piston valve is in its normal seated position on rib seat 9.

Two springs 21 and 22 are employed for biasing piston valve 5 and piston 12 respectively to their normal positions, the biasing compression of said springs being independently adjustable by respective adjusting screws 23 and 24 coaxially screwed, one within the other, in the end wall of casing section 2. An atmospheric vent port 25 in adjusting screw 23 serves to maintain a chamber 26, adjacent the side of piston 12 opposite chamber 18 and in which the springs 21 and 22 are disposed, at atmospheric pressure.

Before the safety valve device above described is placed into operation, the compression of springs 21 and 22 is adjusted from outside the casing by the respective adjusting screws 23 and 24 in accordance with predetermined pressures at which it is desired to have the valve device open and close, respectively, or, in other words, to set the upper and lower pressure limits of the operating pressure range.

In operation, when fluid pressure in conduit 7, and consequently in chamber 6, acting on the area of piston valve 5 outside of rib seat 9, has reached the predetermined maximum pressure, such pressure overcomes the opposing force of spring 21 and unseats piston valve 5 from said rib seat 9, thereby rendering the fluid pressure in said chamber effective over the entire area of piston valve 5 to move said piston valve downwardly, as viewed in the drawing, with a positive action to an open position. With unseating of piston valve 5, as above described, fluid under pressure from chamber 6 flows unrestrictedly through passageway 20 into chamber 18, wherein, due to the restricted venting by way of vent port 19, fluid pressure builds up sufficiently in said chamber to act on piston 12 to move the piston downwardly, as viewed in the drawing, against the opposing force of spring 22, until said piston engages the shoulder 16 on the piston stem 13 in what may be called a holding position and thereby assists the pressure acting on piston valve 5 to maintain said piston valve in an unseated or open position off rib seat 9. As long as piston valve 5 is in its unseated position, fluid under pressure from chamber 6, and consequently from conduit 7, flowing through passageway 20 and chamber 18, is released, or escapes, through atmospheric port 19 until the degree of fluid pressure in chamber 18 acting on piston 12 is reduced by such venting to the minimum operating pressure, as determined by the force of spring 22, at which pressure the force of said spring is effective for moving said piston upwardly, as viewed in the drawing, toward its normal position.

Upward movement of piston 12 effects disengagement of said piston from shoulder 16, thereby freeing piston valve 5 which in turn is returned by spring 21 to its normal position wherein it is reseated on rib seat 9 to cut off further venting of fluid under pressure from chamber 6 and conduit 7. Any fluid under pressure trapped inside rib seat 9 on the upper side of piston valve 5 is vented by way of passageway 20, chamber 18 and vent 19.

If it is desired to change the pressure at which reduction of pressure is first initiated by unseating of piston valve 5, the adjusting screws 23 may be turned in or out with respect to the screw 24. Likewise, if it is desired to change the pressure at which reduction of the pressure in pipe 7 is terminated, screw 24 may be turned in or out with respect to the casing as required.

Description and operation—Fig. 2

The embodiment of the invention represented by Fig. 2 of the drawing is generally similar to that of Fig. 1 and corresponding parts in the two embodiments will be designated herein by the same reference numerals. The embodiment of the invention represented by Fig. 2 of the drawing differs essentially from that of Fig. 1 in that it includes, in addition, means for absorbing or dampening momentary fluid pressure shock waves in the system without causing operation of the valve device to reduce the pressure in the pipe 7.

Referring to Fig. 2, the safety valve device shown therein comprises a casing having an upper section 27 fastened to a lower casing section 2 in a manner similar to that described in connection with Fig. 1, said upper casing section being formed in two coaxially related cylindrical portions 28 and 29, one being of smaller diameter than and extending part way into the other and each having respective bores 30, 31 in coaxial relation.

A piston valve 32 is slidably operable in bore 30, one end of said bore constituting a pressure chamber 33 connected to the conduit 7. Chamber 33 is separated by a wall 34 and an extended cylindrical portion of said wall from an annular chamber 35 adjacent the piston valve 32, said chambers being connected to each other through a restricted passage or choke 36 in said wall. An annular rib seat 37, formed on the extremity of the cylindrical portion of wall 34 in coaxial relation to bore 30, normally encircles and seals off an inner-seated portion of the face of the piston valve 32 when said piston valve occupies a normal position toward which it is urged by spring 21. An annular sealing gasket 38 carried on the face of piston valve 32 engages rib seat 37, when said piston valve is in its normal position, to define the inner-seated area, the remaining annular portion or outer-seated area being exposed to chamber 35 in said normal position of the piston valve. The end of piston valve 32 opposite the end carrying valve seat 38 is provided with a shoulder 39 for a function similar to that of shoulder 16 described in connection with the embodiment shown in Fig. 1.

A piston 40, of larger diameter than piston valve 32, is sealingly and slidably operable in bore 31 in coaxial relation to said piston valve, the latter being movable in a central bore 41 in said piston 40. Piston 40 is urged by a spring 22 toward a normal or neutral position, in which it abuts the annular extremity of cylindrical casing portion 28 which projects into casing portion 29, the latter casing portion cooperating with the extending portion 28 and with piston 40 to form a control chamber 42 that is constantly connected or open to atmosphere through a restricted vent or choke 43 in the casing wall of predetermined flow capacity less than the flow capacity of the inlet to chamber 33 by which the conduit 7 is connected thereto. In its normal position, piston 40 is also out of engagement with shoulder 39 of the piston valve 32, said shoulder being adapted to be engaged by piston 40 upon downward movement thereof, as viewed in the drawing, to a lower or holding position defined by engagement of piston 40 with a shoulder 44 formed by casing section 2. With piston 40 in its holding position and engaging shoulder 39, piston valve 32 is maintained off rib seat 37 for a purpose to be hereinafter explained.

A plurality of radial ports 45 are formed in that portion of casing portion 28 extending into casing portion 29, and are so situated as to connect bore 30, and therefore chambers 33 and 35, with chamber 42 when piston valve 32 is moved downwardly, as viewed in the drawing, to a release position determined by engagement of piston 40 with shoulder 44.

Adjusting screws 23 and 24 on which springs 21 and 22, respectively, are seated provide means for adjusting the compression force of the springs, as in Fig. 1.

In operation, let it be assumed that the compression of springs 21 and 22 has been adjusted in accordance with the predetermined maximum and minimum operating pressures at which it is desired to have the respective piston valve 32 and piston 40 operate to respectively effect opening and closing of the valve device. When fluid pressure in chamber 33 and therefore in chamber 35 has built up to maximum pressure, such pressure is effective to unseat piston valve 32 from rib seat 37 against the opposing force of spring 21, the piston valve being thus shifted to its release position in which fluid under pressure escapes from chamber 33 and pipe 7 via ports 45 to chamber 42 to act on piston 40. Because of its larger pressure area and less relative spring opposition from spring 22, piston 40 is moved promptly and positively to its lower position, and in so moving engages shoulder 39 of piston valve 32 to maintain said piston valve in its release position until fluid pressure in control chamber 42, which is vented by way of vent port or choke 43, is reduced to minimum pressure.

When pressure of fluid in control chamber 42 has been reduced to minimum operating pressure, spring 22 effects return movement of piston 40 to its normal position, thereby disengaging shoulder 39 of piston valve 32. As piston 40 moves away from shoulder 39, spring 21 is effective to cause said piston valve to follow correspondingly and move to its normal position. With piston valve 32 thus reseated on rib seat 37, further venting of fluid under pressure from chamber 33 and conduit 7 is terminated.

It should be noted at this point that, if excessive pressure of fluid in conduit 7 and chamber 33 occurs due to a momentary pressure pulsation or shock wave, as compared to a relatively slow rate of build-up of fluid pressure in the conduit and chamber, such momentary excessive pressure is not effective to unseat piston valve 32 from rib seat 37. Excessive fluid pressure, due to a momentary pressure pulsation, is effective only on the inner-seated area of piston valve 32 within the rib seat 37, the choke 36 being of such restricted flow rate as to prevent effectiveness of the pulsation pressure on the outer-seated area adjacent chamber 35. The inner-seated area of piston valve 32 encircled by rib seat 37 is merely a portion of the total pressure area of said piston valve. Therefore, the total force of a momentary pulsation must exceed the setting of spring 21 in order to unseat said piston valve from said rib seat. Therefore, momentary pressure surges or pulsations are effectively dampened, and undesirable operation of the safety valve device is thus prevented. Of course, if the total force of a momentary pressure surge should sufficiently exceed the setting of spring 21, unseating of piston valve 32 would be effected to cause the valve device to operate. With a pressure surge of such magnitude, however, there would be no objection to operation of the safety valve device since it would be desirable to effect relief of the pressure surge of such magnitude. It will be apparent that by varying the amount of inner seated area within rib seat 37, the total force necessary for a momentary pulsation to unseat the piston valve 32 can be accordingly changed.

Having now described the invention, what I claim as new and desire to secure by Letters Patent, is:

1. A safety valve device for preventing excessive fluid pressure build-up in a fluid pressure system, said device comprising, in combination, a casing having a pressure chamber, an inlet to said chamber for connection to the pressure of fluid in said system, a valve having a normal position in which the pressure chamber is closed to atmosphere, first biasing means for urging said valve toward its normal position, said valve having a pressure area and being operable, in response to a predetermined pressure of fluid in said pressure chamber acting on said pressure area in opposition to the force of said biasing means, to an open position in which the pressure chamber is opened to atmosphere via a vent port in said casing of predetermined flow capacity less than the flow capacity of said inlet to reduce the pressure of fluid in said chamber, a valve stem extending coaxially from one side of said valve, a first stop formed on the end of said valve stem remote from the valve, a piston operable in said casing and having a concentric bore in which said valve stem is sealingly and axially movable relative to the piston, said piston being disposed on said valve stem between the valve and said first stop and having a normal position in which said valve is free to move between its normal and open positions, a second stop formed in said casing for determining the normal position of the piston, and second biasing means for urging said piston toward its normal position, said piston being subjected on one side thereof to fluid pressure from said pressure chamber, upon operation of said valve to its open position, and being operable, in response to such fluid pressure and against the opposing force of said second biasing means, to a holding position in which it engages said first stop to prevent movement of said valve to its normal position until the pressure of fluid in said pressure chamber has been reduced to a predetermined minimum pressure, at which said second biasing means is effective for restoring said piston to its normal position and said first biasing means is effective for restoring said valve to its normal position upon movement of said piston to its normal position.

2. A safety valve device for protecting a fluid pressure system against excessive fluid pressure build-up, said device comprising, in combination, a casing having a pressure chamber, an inlet to said chamber for connection to the pressure of fluid in said system, valve means operable responsively to pressure of fluid in said pressure chamber from a closed position to an open position in which it establishes a communication between the pressure chamber and a second chamber connected to atmosphere via a vent port formed in said casing and of smaller flow capacity than said inlet to thereby reduce the pressure of fluid in said second chamber, a valve stem extending coaxially from one side of said valve means and terminating at its remote end with a shoulder formed thereon, first biasing means yieldably resisting movement of said valve means to its open position and urging the valve means toward its closed position, fluid pressure responsive holding means slidably operable on said valve stem and axially movable relative thereto, said holding means being subjected on one side thereof to pressure of fluid in said second chamber, upon operation of said valve means to its open position, and being operable responsively to such pressure of fluid in said second chamber from a normal position, defined by engagement of said holding means with an internally formed annular shoulder in said casing and in which said valve means is free to move between its closed and open positions, to a holding position in which said holding means engages said shoulder formed on said valve stem and said valve means is prevented from moving to its closed position, and second biasing means yieldably resisting movement of said holding means to its holding position and serving to return said holding means to its normal position upon reduction of fluid pressure in said second chamber to a predetermined measure.

3. The combination as defined in claim 2 in which each of the biasing means comprises a spring and respective means accessible from the exterior of the safety valve device for adjusting the resisting force of said springs to correspondingly vary the respective fluid pressures at which reduction of fluid pressure in the pressure chamber is initiated and terminated.

4. A safety valve device comprising, in combination, a casing having therein a pressure chamber, an inlet to said pressure chamber for connection to a source of fluid under pressure, a control chamber in the casing open to atmosphere by way of a restricted vent formed in said casing, piston valve means cooperating with a valve seat and having means to bias it toward a normal position, in which it cuts off communication between said pressure chamber and said control chamber, and being operable, in response to pressure of fluid in said pressure chamber in excess of a certain maximum degree acting on a pressure area of said piston valve means, to a release position in which said pressure chamber is opened to said control chamber and, therefore, to atmosphere, and piston means having a pressure area larger than the pressure area of said piston valve means and subject to pressure of fluid in said control chamber, said piston means having means to bias it toward a position in which said piston valve means is free to move between its normal and release positions and being operable responsively to fluid pressure acting on the pressure area thereof, upon opening of said control chamber to fluid pressure in said pressure chamber, to a holding position in which said piston valve means is engaged by said piston means and maintained in its release position until the pressure of fluid in said control chamber and, therefore, said pressure chamber has been reduced to a certain predetermined minimum degree.

5. The combination as defined in claim 4, in which said respective means for biasing said piston valve means and said piston means toward their respective normal positions comprise spring means, each of said spring means being independently adjustable whereby the respective degrees of pressure at which reduction of the pressure of fluid in the pressure chamber is initiated and terminated may be varied accordingly.

6. A safety valve device for protecting a fluid pressure system against excessive fluid pressure build-up, said device comprising, in combination, a casing having therein a pressure chamber, an inlet to said chamber for connection to the pressure of fluid in said pressure system, a valve in said casing cooperating with a valve seat and having on one side a pressure area subject to the fluid pressure in said pressure chamber and being subject on its opposite side to the pressure in a control chamber which is open to atmosphere via a restricted vent port formed in said casing, said valve having a closed position, in which it is seated on said valve seat and communication between said pressure chamber and atmosphere, via said control chamber, is closed, and being operable responsively to fluid in said pressure chamber acting on said pressure area at a certain predetermined maximum degree of pressure to an open position in which it is unseated from said valve seat and said communication is open, first biasing means for urging said valve toward its closed position, a piston in said casing having a pressure area larger than the pressure area of said valve, said piston having a normal position, in which said valve is free to move between its closed and open positions, and being operable, upon operation of said valve to its open position, in response to fluid pressure build-up in said control chamber, as effected by restrictive action of said vent port, acting on the piston pressure area, to a holding position in which said valve is prevented from returning to its open position, and second biasing means effective, upon reduction of fluid pressure in said control chamber to a predetermined minimum degree, for moving said piston to its normal position and thereby rendering said first biasing means effective for restoring said valve to its closed position.

7. A safety valve device for preventing excessive fluid pressure build-up in a fluid pressure system, said device comprising, in combination, a casing having therein a pressure chamber, an inlet to said pressure chamber for connection to a fluid pressure source, a control chamber in the casing open to atmosphere through a restricted vent, a piston valve cooperating with a valve seat and having a seated position thereon in which communication between said chambers is disestablished and in which seated position only a portion of a pressure area of said piston valve is subject to fluid pressure in said pressure chamber, first biasing means for urging said piston valve toward its seated position, said piston valve being operable against the force of said biasing means in response to build-up of fluid pressure in said pressure chamber to a degree in excess of a certain maximum degree, to an unseated position off said valve seat in which the entire pressure area of said piston valve is exposed to the pressure of fluid in said pressure chamber and said pressure chamber is placed in communication with said control chamber and, therefore, with atmosphere by way of said restricted vent whereby fluid under pressure is admitted to said control chamber from said pressure chamber and is exhausted to atmosphere, said piston valve having a stem on which a shoulder is formed, a piston concentrically slidable on said stem and having a pressure area larger than said entire pressure area of said piston valve subject to the pressure of fluid in said control chamber, said piston normally occupying a normal position in which said piston valve is free to move between its seated and unseated positions, said piston being operable, upon admission of fluid pressure into said control chamber and acting on the piston pressure area, to a holding position in which it is engageable with the shoulder on said stem for preventing said piston valve from returning to its seated position until the pressure of fluid in said control chamber and, therefore, in said pressure chamber has been reduced to a certain predetermined minimum degree, and second biasing means effective upon reduction of fluid pressure in said control chamber to said minimum degree for returning said piston to its normal position.

8. The combination as defined in claim 7, further comprising respective adjusting screw means accessible from the exterior of the casing to vary the biasing force exerted by said first biasing means and said second biasing means so as to correspondingly vary the respective fluid pressures at which reduction of fluid pressure in the system is initiated and terminated.

9. A safety valve device for preventing excessive fluid pressure build-up in a fluid pressure system, said device comprising, in combination, a casing having therein a pressure chamber, an inlet to said chamber for connection to a fluid pressure source, a partially isolated chamber in said casing connected to said pressure chamber by a choked passageway, said casing also having therein a control chamber open to atmosphere by way of a restricted vent, a piston valve cooperating with a valve seat and having a normal position in which it is seated on said valve seat and communication between said pressure chamber and said control chamber is disestablished and in which position a portion of a pressure area of said piston valve is exposed to pressure of fluid in said pressure chamber and the balance of the pressure area is exposed to the pressure of fluid in said isolated chamber, first biasing means for urging said piston valve toward its normal position, said piston valve being operable, against the force of said first biasing means in response to build-up of fluid pressure in said pressure chamber and said isolated chamber to a degree in excess of a certain maximum degree, to a release position in which it is unseated from said valve seat and said pressure chamber and said isolated chamber are placed in communication with said control chamber and, therefore, with atmosphere by way of said restricted vent whereby fluid under pressure is admitted to said control chamber from said pressure and isolated chambers and is exhausted to atmosphere, a piston having a pressure area larger than the pressure area of said piston valve and subject to the pressure of fluid in said control chamber, said piston normally occupying a normal position in which said piston valve is free to move between its normal and release positions, said piston being operable, upon admission of fluid pressure into said control chamber and acting on the piston pressure area, to a holding position in which said piston valve is prevented from returning to its normal position until the pressure of fluid in said control chamber and, therefore, said pressure and isolated chambers, has been reduced to a certain predetermined minimum degree, and second biasing means effective upon reduction of fluid pressure in said control chamber to said minimum degree for returning said piston to its normal position.

10. A safety valve device for protecting a fluid pressure system against excessive fluid pressure build-up, said device comprising, in combination, a casing having therein a first pressure chamber, an inlet to said first pressure chamber for connection to the pressure of fluid in said system, valve means having a pressure surface and cooperating with a valve seat, a portion of said pressure surface being unrestrictedly open to the fluid pressure in said first pressure chamber, means providing a restricted passage through which the remaining portion of said pressure surface is subject to the pressure of fluid in said first pressure chamber, the flow rate of said restricted passage being of such capacity as to prevent momentary fluid pressure surges occurring in the system from effecting an increased pressure on the said remaining portion of the pressure surface of the valve means, said valve means being operable responsively to the force of fluid pressure acting on the entire area of said pressure surface, from a closed position, in which it is seated on said valve seat, to an open position, in which it is unseated from the valve seat, for establishing a communication between the said first pressure chamber and a second pressure chamber connected to atmosphere via a vent port formed in said casing whereby fluid pressure in said first pressure chamber may be reduced, first biasing means yieldably resisting movement of said valve means to its open position and for returning said valve means to its closed position, piston means having a pressure area larger than the pressure surface of said valve means, said piston means being operable responsively to pressure of fluid in said second chamber acting on the pressure area of said piston means, from a normal position, in which said valve means is free to move between its closed and open positions, to a holding position in which said valve means is prevented from returning to its closed position, and second biasing means yieldably resisting movement of said piston means to its holding position and serving to return said piston means to its normal position upon reduction of fluid pressure in the communication a predetermined measure.

References Cited in the file of this patent

UNITED STATES PATENTS 2,591,528 Filstrup Apr. 1, 1952